(12) United States Patent
Chow

(10) Patent No.: US 11,502,536 B2
(45) Date of Patent: Nov. 15, 2022

(54) WIRELESS CHARGING MOUNT

(71) Applicant: Bracketron, Inc., Edina, MN (US)

(72) Inventor: Andrew Chow, Hugo, MN (US)

(73) Assignee: BRACKETRON, INC., Edina, MN (US)

( * ) Notice: Subject to any disclaimer, the term of this patent is extended or adjusted under 35 U.S.C. 154(b) by 484 days.

(21) Appl. No.: 16/416,867

(22) Filed: May 20, 2019

(65) Prior Publication Data

US 2020/0076220 A1 Mar. 5, 2020

Related U.S. Application Data

(60) Provisional application No. 62/673,304, filed on May 18, 2018.

(51) Int. Cl.
| | |
|---|---|
| *H02J 50/90* | (2016.01) |
| *H02J 7/02* | (2016.01) |
| *H02J 7/00* | (2006.01) |
| *H04M 1/04* | (2006.01) |
| *H02J 50/10* | (2016.01) |

(52) U.S. Cl.
CPC ............ *H02J 7/025* (2013.01); *H02J 7/0044* (2013.01); *H02J 50/10* (2016.02); *H02J 50/90* (2016.02); *H04M 1/04* (2013.01)

(58) Field of Classification Search
CPC ...................................................... H02J 50/90
USPC .......................................................... 320/108
See application file for complete search history.

(56) References Cited

U.S. PATENT DOCUMENTS

| | | | | |
|---|---|---|---|---|
| 9,184,620 | B2 * | 11/2015 | Kossi | H02J 50/10 |
| 2006/0205381 | A1 * | 9/2006 | Beart | G06F 1/1632 |
| | | | | 455/343.1 |
| 2016/0261138 | A1 * | 9/2016 | Wu | H02J 7/0044 |
| 2016/0344241 | A1 * | 11/2016 | Hong | H02J 7/00045 |
| 2017/0012461 | A1 * | 1/2017 | Hayashi | H02J 7/0044 |
| 2017/0346348 | A1 * | 11/2017 | Lethellier | B60L 53/38 |
| 2019/0126154 | A1 * | 5/2019 | Sears | H04M 1/04 |
| 2020/0259368 | A1 * | 8/2020 | Miller | H02J 7/0042 |

\* cited by examiner

*Primary Examiner* — Edward Tso
*Assistant Examiner* — Ahmed H Omar
(74) *Attorney, Agent, or Firm* — Daniel J. Polglaze; Westman, Champlin & Koehler, P.A.

(57) ABSTRACT

A mobile device mounting template includes at least one ferromagnetic strip, and a base sheet to which the at least one ferromagnetic strip is releasably affixed. The base sheet includes a template sheet and a release liner, the template sheet having markings thereon for positioning the device mounting template on a mobile device, and the release liner being removably releasable from the template sheet. A method of mounting a ferromagnetic strip to a mobile device includes positioning a template having the ferromagnetic strip removably attached thereto so that the ferromagnetic strip is exposed, positioning the ferromagnetic strip on a mobile device using a template alignment line on the template, adhering the ferromagnetic strip to the mobile device with an adhesive on the ferromagnetic strip, and removing the template.

16 Claims, 7 Drawing Sheets

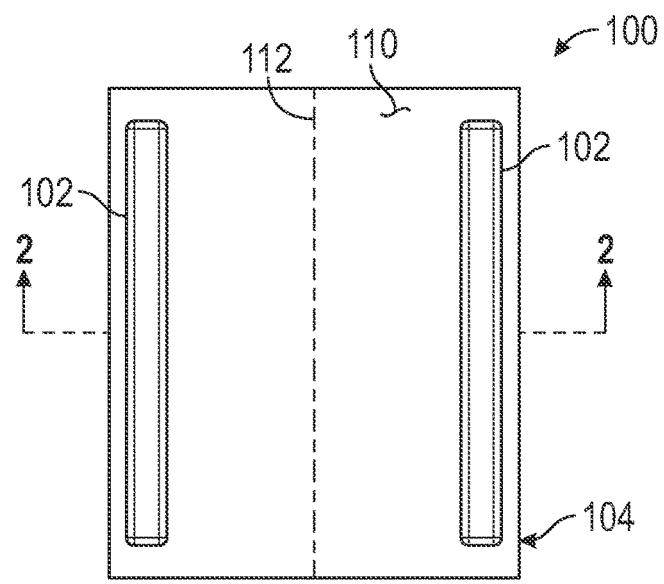
FIG. 1
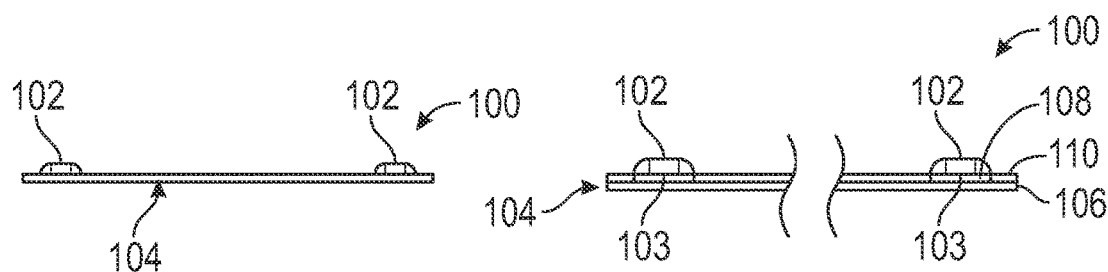
FIG. 2   FIG. 3
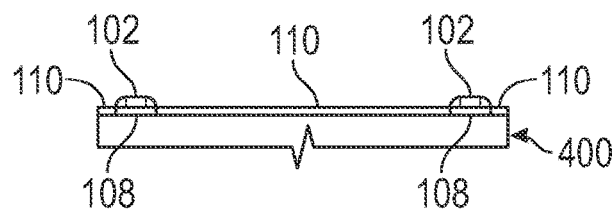   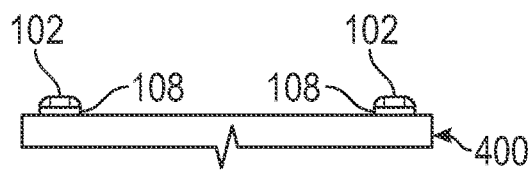
FIG. 4   FIG. 5

WIRELESS CHARGING MOUNT

FIELD

This application is directed toward mounting devices to mobile mounts, and more specifically, toward mounting solutions that allow more universal mounting.

BACKGROUND

Wireless charging of mobile devices such as telephones is increasingly available. Wireless charging is effected in one embodiment by powering an induction coil (also called a charging coil) in a charging base to create and alternating magnetic field. A receiving coil embedded in a device, such as a mobile phone, tablet, GPS, or the like, converts the alternating magnetic field into a charging current in the device to charge the device. Wireless charging is taking hold as a standard for charging devices such as mobile phones, cameras, global positioning systems, etc. These devices have a receiver (e.g., a receiving coil) built into the device and require a charging pad of some sort that contains a transmitter (e.g., a charging coil). The device typically lays flat on the charging pad or is secured in place somehow to keep the charging receivers and the transmitters aligned.

While wireless charging may be slower than conventional charging using a cable connected to the phone, it is often considered easier than wired charging, as the mobile device is simply placed on a charging station. Many mobile device manufacturers use very similar wireless charging technology. For example, most mobile devices that support wireless charging use the Wireless Power Consortium's Qi charging standard. As such, most wirelessly chargeable devices will work on most wireless chargers. While other charging standards include the Powermat PMA or Alliance for Wireless Power standards, Powermat has joined the Wireless Power Consortium, so a nearly unified wireless charging standard will potentially soon be used.

SUMMARY

In one embodiment, a mobile device mounting template includes at least one ferromagnetic strip, and a base sheet to which the at least one ferromagnetic strip is releasably affixed. The base sheet includes a template sheet and a release liner, the template sheet having markings thereon for positioning the device mounting template on a mobile device, and the release liner being removably releasable from the template sheet.

In another embodiment, a charging system for an inductively charged mobile device includes a charging pad having a charging coil in a charging pad body, and a plurality of markings on the charging pad body, the plurality of markings identifying a center of the charging coil, and a mounting template. The mounting template includes a pair of ferromagnetic strips, and a base sheet to which the pair of ferromagnetic strips is releasably affixed. The base sheet includes a template sheet and a release liner, the template sheet having markings thereon for positioning the device mounting template on a mobile device for affixing the pair of ferromagnetic strips to the mobile device, and the release liner being removably releasable from the template sheet.

In another embodiment, a method of mounting a ferromagnetic strip to a mobile device includes positioning a template having the ferromagnetic strip removably attached thereto so that the ferromagnetic strip is exposed, positioning the ferromagnetic strip on a mobile device using a template alignment line on the template, adhering the ferromagnetic strip to the mobile device with an adhesive on the ferromagnetic strip, and removing the template.

In another embodiment, an application for a mobile device includes a set of instructions for causing a processor of the mobile device to perform a method. The method includes displaying on a screen of the mobile device an alignment screen having an application alignment line thereon, wherein the application alignment line is configured to indicate a position of a charging coil of the mobile device.

BRIEF DESCRIPTION OF THE DRAWINGS

FIG. 1 is a top view of a template mount according to an embodiment of the present disclosure;

FIG. 2 is a view taken along lines 2-2 of FIG. 1;

FIG. 3 is a more detailed view of the template mount of FIG. 2;

FIG. 4 is a side view of a template mount partially mounted to a mobile device according to an embodiment of the present disclosure;

FIG. 5 is a side view of the template mount of FIG. 4 fully mounted to a mobile device;

DETAILED DESCRIPTION

Figure 6:
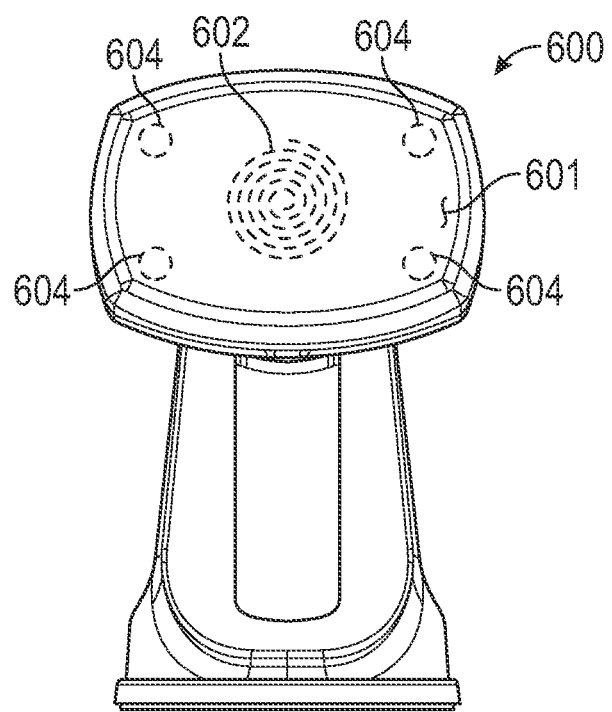
FIG. 6. is a front elevation view of a mobile mount with which embodiments of the present disclosure may be used.

It is not usually clear exactly where a receiving coil may be positioned within a mobile device. Even those devices that indicate where the coil is may not be completely accurate. Further, with an increasing number of devices being chargeable using wireless charging, and with those devices having different sizes, shapes, and locations of receiver coils, it may not be clear where to place a device on or near a wireless charging base in order to properly charge it. Specifically, experimentation may be needed to properly position a device on an unfamiliar charger. Further, if a device is not properly placed on a wireless charger, the efficiency of the charging drops.

Wireless charging is increasingly available in mobile phone mounts, such as those used in vehicles or the like. Such mounts have specific orientations and locations of charging coils. In order to allow mounting of devices to a mobile mount, some proposed solutions have included mounting of a metal plate to the back of the mobile device. Some of these plates are round, rectangular or square and contain an adhesive to stick the plates to the device. However, wireless charging efficiency is reduced or completely eliminated by metal between the charging coil and the receiving coil. Other solutions use a metal plate with an opening therein, with the opening to be positioned so that the receiving coil is not covered by the plate. However, since the exact position of the receiving coil is not usually known, and can vary from device to device even within the same model due to slight manufacturing differences, it can be difficult to properly place and affix a plate on a mobile device. Since such plates typically are at least semi-permanently mounted to a mobile device, if the plate is mounted incorrectly, removal and re-placing of the plate may be difficult, and/or damage the mobile device.

Recently, manufacturers have begun making charging mounts/stands that use magnets to secure the device on to the charging pad. The device with metal plate attached adheres to the mount with a series of magnets that are secured to the mount. These magnets are usually placed in a square pattern so they can adhere to the corners of the metal plate. The charging element is usually in the center. This allows for the device to be aligned with the charging element on the mount/stand. A soft rubber pad is applied to the face of the mount/stand to help the device not slide around if the mount is in a moving vehicle. These devices are more desirable as they make the user experience simpler and more elegant. It also allows for the charging pads to be designed smaller and sleeker which customers want.

Configurations such as those discussed above have some flaws, however. The metal plates must be adhered to the back of the device and centered over the charging element to work properly. This presents a challenge to the user in two ways. Not all devices have the charging elements in the same place. They vary significantly from device to device. The customer must estimate the location by placing the device on the charging pad to see where it begins charging. Then they must apply the metal plate in the right spot without any available tools or templates to guide them. It is impossible to supply the templates for all devices with the metal plates so the customer must guess. If they guess wrong, they need to remove the metal plate and try to re-stick it. Most of the time, these metal plates are single use plates and are destroyed if you remove them. There is also a high likelihood that the user might place the metal plate on crooked and the device may charge but the plate would look bad on the back of the device. Many manufacturers include more than one plate in case the customer makes an error. This process can be frustrating and can generate many customer service issues and product returns.

As mentioned, it can be difficult to properly position a receiving coil with respect to the charging coil on the mount. It is also difficult to properly position a plate on a mobile device to keep the receiving coil exposed. Attempts to allow location of a plate with an opening therein on a mobile device include elaborate instructions for lining up a plate, measuring a distance from multiple edges of the mobile device to determine where the receiving coil is. Even then, as has been mentioned, the location of the receiving coil may not be exactly known. Further, Such measurement techniques typically require a user to attempt to line up the plate at a particular location, and then apply the plate, hoping that the alignment is correct.

Another flaw is the aesthetic design of the metal plates themselves. These plates are usually rather large and unsightly. They can be placed under a protective case but that reduces the effectiveness of the magnets that hold the device into place. To compensate for allowing the user to place the metal plates under the case, manufactures make the plates thicker for more holding power. Thicker plates also make it difficult to use devices with curved backs as the user must bend the plates to have them stick properly to the device. Thicker metal is harder to contour to the back of a curved device. The market is also trending to clear protective cases and or no cases at all as devices are becoming sleeker, water proof and shatter proof. Placing an unattractive metal plate on a well-designed device is not preferable.

It becomes more complicated for a user when it is desired that the mobile device to be charged is upright and not laying flat on the charging pad. In order to keep the charging elements aligned, manufacturers have designed stands and mounts that contain clamps, magnets and angled stands to hold the device upright while keeping the charging elements aligned. Some manufacturers have designed charging pads with multiple elements to accommodate the variety of devices and how they are configured. This adds significant cost and makes the charging devices larger and bulkier.

Embodiments of the present disclosure address the issues and challenges with prior mounting solutions. Embodiments of the present disclosure include ferromagnetic strips mounted to a template for aligning with a mobile device to place the ferromagnetic strips in a position to allow the device to be held to a magnetic mount, to allow wireless charging to be performed without reducing its efficiency, and to provide a solution that is aesthetically pleasing.

By changing from a large single metal plate to two thin strips of ferromagnetic material (e.g., steel), the mounting solution is more attractive so the user can place the strips on an outside of a mobile device. The strips may be made thicker, wider, and stronger if they are to be placed inside a case for a mobile device. Embodiments of the present disclosure are also amenable to mounting on mobile devices with curved backs, as they do not need to be bent to fit device curvature.

Embodiments of the present disclosure allow for the attachment of a set of metal strips to a mobile device, allowing also for the proper placement of the strips to operate in conjunction with mount magnets to hold the device to the mount, without danger of covering or occluding in some way the receiving coil of the device. In one embodiment, shown in top view in FIG. 1 and side elevation in FIG. 2, a mobile device mount template 100 comprises a set of steel strips 102 mounted to a base sheet 104. Base sheet 104, as shown in greater detail in FIG. 3, comprises a release liner 106, adhesive 108 applied to sides 103 of steel strips 102 where the strips will attach to a mobile device, and template sheet 110. Release liner 106 protects adhesive 108 and template sheet 110 until template 100 is to be used to apply strips 102 to a mobile device.

As is shown in FIG. 1, template sheet 110 has alignment marking 112 which may be used to assist in lining the mount template 100 with a mobile device. The steel strips 102 are positioned on the mount template 100 so as to allow the strips 102 to be positioned near an outer edge of a mobile device so as not to interfere with a receiving coil within the mobile device. The release liner 106 is a protective film covering the adhesive 108 and template sheet 110.

The single device mount template 100 template sheet 110 is in one embodiment a transparent material with gridlines printed on its surface. The metal strips 102 are adhered to the template sheet 110 during production and adhesive 108 is applied to the metal strips 102. A release liner 106 protects the adhesive 108 until the device mount template 100 is ready for use. A user removes the release liner 106 from the template sheet 110 and centers the template sheet 110, with the affixed strips 102, on the mobile device using the gridlines 112 as a reference. Once the template sheet 110 is centered, the user presses firmly on the metal strips 102 so they adhere to the device. Once that is accomplished, the user peels off the template sheet 110.

In one embodiment, two sets of strips 102 are provided, with one set configured for application to an outside of a case or mobile device, and the second set being configured for use between a device and a case. In one embodiment, the metal strips 102 are highly polished thin strips that integrate well with the design of the device.

Mounting of the steel strips 102 is shown in steps in FIGS. 4 and 5. In FIG. 4, after release liner 106 has been removed from template 100, the template sheet 110 is used to align strips 102 to a back of a mobile device 400 (or the back of a case holding the mobile device —not shown). The template sheet 110 is in one embodiment a releasable sticky plastic to releasably hold the template sheet to the mobile device while positioning the strips 102 according to the marking 112 on the template. To fully secure the strips 102 to the mobile device 400, a user applies pressure to the strips 102 to more fully engage the adhesive 108 at the bottom 103 of the strips 102 with the mobile device 400. Once the strips 102 are secure to the device 400, the template sheet 110 is peeled off, with the result shown in FIG. 5. In one embodiment, the base sheet 104 is sized so as to place the strips 102 clear from a receiving coil in a mobile device, in one embodiment near outer edges of a case for a mobile device or of the mobile device itself.

While one marking 112 is shown, it should be understood that the template sheet 110 may be provided with grid lines, intersecting lines, or the like, without departing from the scope of the disclosure. In one embodiment, the steel strips 102 are polished steel. While strips 102 are described as steel strips, it should be understood that any ferromagnetic material that is attracted to magnets may be used without departing from the scope of the disclosure.

Figure 7:
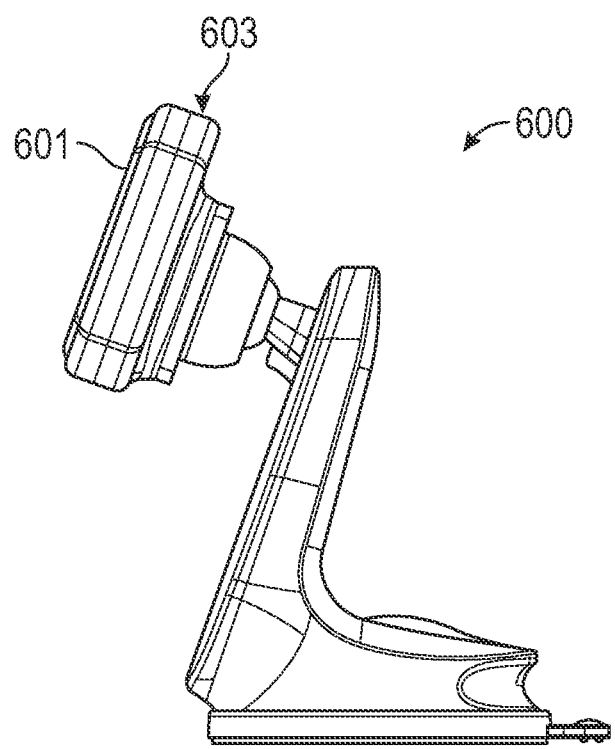
FIG. 7 is a side elevation view of the mobile mount of FIG. 6.
Figure 8:
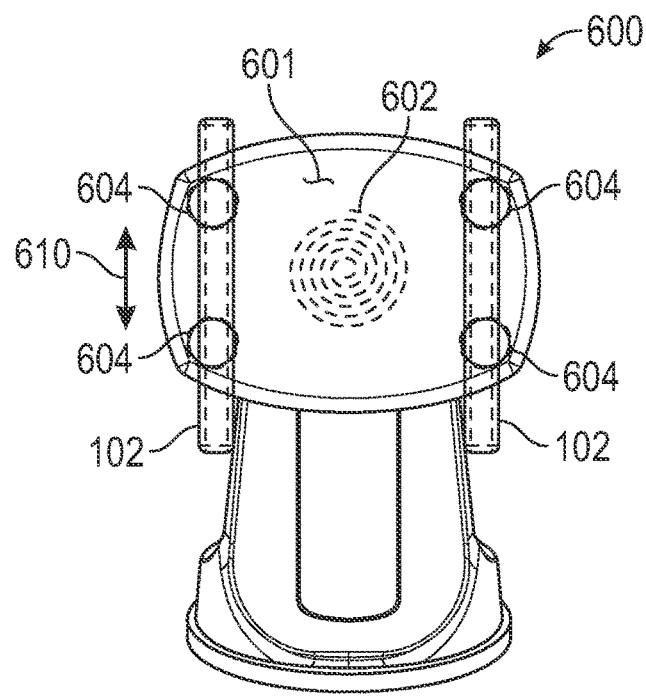
FIG. 8 is a front elevation view of a mobile mount showing positioning of its magnets and of ferromagnetic strips according to an embodiment of the present disclosure.

FIGS. 6 and 7 show a front elevation and side elevation view of a representative embodiment of a mobile device mount 600, respectively, the may be used with embodiments of the present disclosure. Face 601 of mount 600 is in one embodiment a soft rubber or other gripping material face covering the body 603 of the mount 600. Positions of a charging coil 602 and magnets 604 are shown in dashed lines. The charging coil 602 and magnets 604 are typically beneath the face 601. Referring now to FIG. 8, a representative positioning of strips 102 with respect to the charging coil 602 and magnets 604 is shown. As has been discussed, and shown above, strips 102 may be mounted to a back of a mobile device. The elongated strips 102 are positioned so as to allow the magnets 604 to attract the strips 102, but also allow for the mobile device to which the strips 102 are attached to be positioned in a direction shown by arrow 610 to align a receiving coil of a mobile device to be aligned with the charging coil to achieve the greatest coupling and therefore most efficient charge. This freedom of positioning allows for the strips 102 of template 100 to be used for a wide variety of mobile device mounts.

Typical charging mounts such as those shown in FIGS. 6-8 have magnets positioned at the edges of the pad. Embodiments of the present disclosure, such as those shown in FIGS. 9A, 9B, 10A, and 10B move the magnets from the edges to just outside the charging coil. The magnets are arranged in clusters or strips of magnets 604. Mounts employing the soft rubber cover 601 allow devices with curved backs adhere better to the mount. The magnet patters of FIGS. 9A, 9B, 10A, and 10B along with the metal strips 102 on the device allow a user to move the device up or down on the mount/stand until the charging elements from the mount and the device are properly linked. Once linked, the user can let go of the device and the magnets hold the device in place securely even when the device is used in a moving vehicle. This design also allows for a smaller and sleeker mount/stand as a smaller area for the magnets is provided.

Figure 9A:
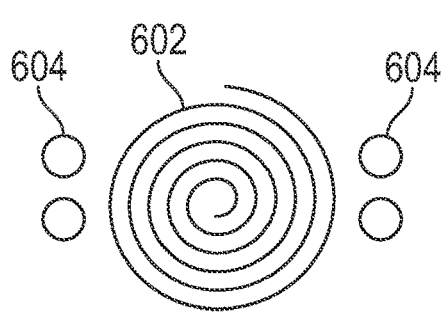
FIG. 9A is a view of a mobile mount magnet and charging coil alignment embodiment in portrait mode.
Figure 9B:
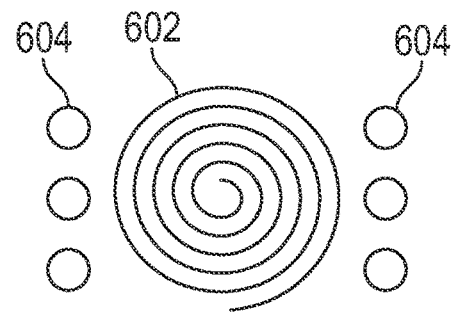
FIG. 9B is a view of another mobile mount magnet and charging coil alignment embodiment in a portrait mode.
Figure 10A:
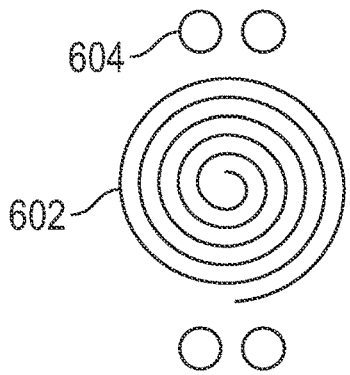
FIG. 10A is a view of a mobile mount magnet and charging coil alignment embodiment in landscape mode.
Figure 10B:
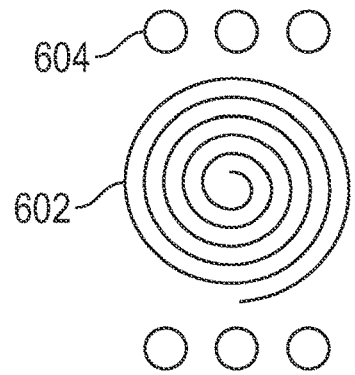
FIG. 10B is a view of another mobile mount magnet and charging coil alignment embodiment in a landscape mode.

In one embodiment, configurations of a charging coil 602 and clusters of magnets 604 are shown in a portrait mode in FIGS. 9A and 9B. FIG. 9A shows four magnets 604 and a charging coil 602, and FIG. 9B shows six magnets 604 and a charging coil 602. FIGS. 10A and 10B show the arrangements of FIGS. 9A and 9B, respectively, in a landscape mode. It should be understood that additional magnets may be used without departing from the scope of the disclosure.

The strips 102, as have been mentioned, may be mounted to a back of a mobile device such as device 400 shown above. Strips 102 may instead be mounted to a back of a protective case for a mobile device. Additionally, while some reduction in attraction between the magnets of a mount and the mobile device to which the strips 102 are mounted may occur, strips 102 could alternatively be mounted within a body of a mobile device, or on the inside of a case for the device, without departing from the scope of the disclosure.

Figure 11:
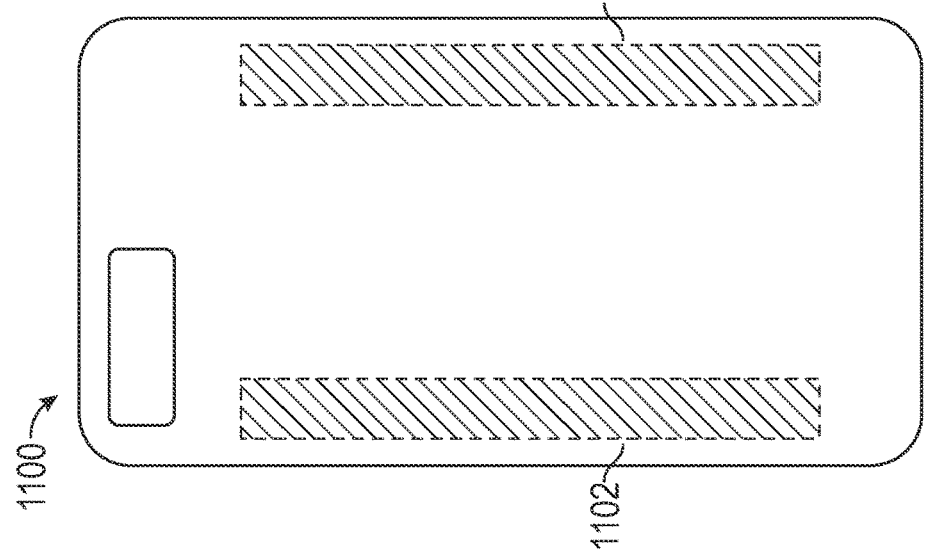
FIG. 11 is a top view of a mobile device case according to an embodiment of the present disclosure.

FIG. 11 shows an alternative embodiment of a mobile device case 1100, such as a telephone case, having integrated ferromagnetic perimeter plates 1102 within the case 1100, or on an exterior of the case 1100. As the integrated ferromagnetic plates 1102 are elongated, similarly to strips 102 described above, the mobile device case 1100 may be moved so as to effectively position a mobile device receiving coil with respect to a charging coil of a mobile mount. Such an embodiments allow for aesthetically pleasing yet functional mounting solutions for mounting a mobile device onto a mobile mount.

Figure 12:
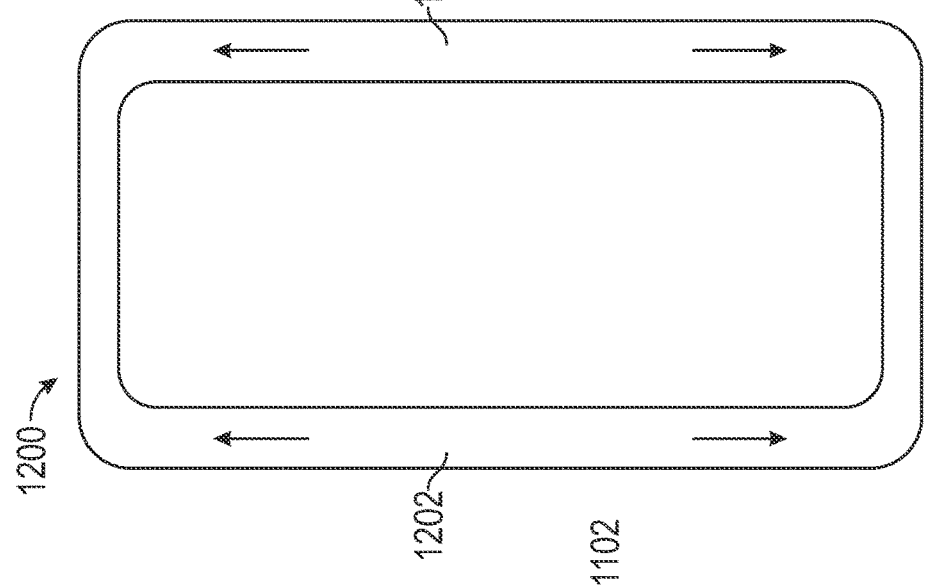
FIG. 12 is a top view of a mobile device case or mobile device according to an embodiment of the present disclosure.

FIG. 12 shows a back cover or plate 1200 for a mobile device, having integrated ferromagnetic strips 1202 therein. As the integrated ferromagnetic plates 1202 are elongated, similarly to strips 102 described above, the mobile device back plate or cover 1200 may be moved so as to effectively position a mobile device receiving coil with respect to a charging coil of a mobile mount. Such an embodiments allow for aesthetically pleasing yet functional mounting solutions for mounting a mobile device onto a mobile mount.

Figure 13:
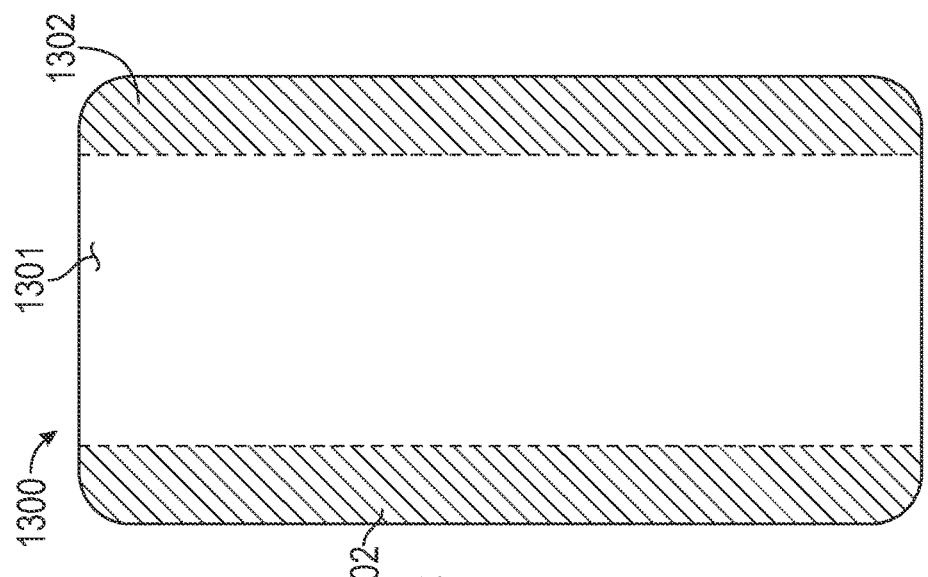
FIG. 13 is a top view of a sticker embodiment of the present disclosure.

FIG. 13 shows another embodiment 1300 of a template for providing a ferromagnetic solution for positioning a mobile device on a mobile mount. Device 1300 is in this embodiment a sticker having a stocker body 1301 and integrated ferromagnetic plates 1302. Sticker body 1301 in one embodiment is a clear plastic sticker which may be affixed using sticker adhesive to a cover or back plate of a mobile device, or to an interior or exterior of a mobile device case. Once again, the elongated ferromagnetic strips 1302 allow for the adjustable positioning of the strips 1302 to place the charging coil of a mobile mount in proper proximity to a receiving coil of the mobile device.

Figure 14:
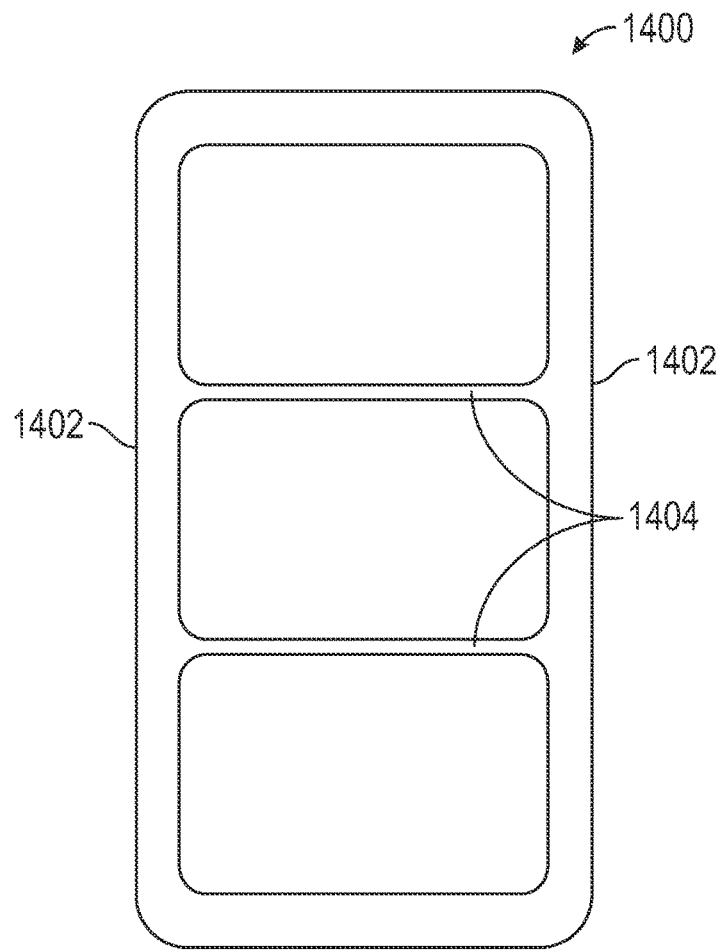
FIG. 14 is a top view of another configuration for ferromagnetic strips according to an embodiment of the present disclosure.

FIG. 14 shows another embodiment 1400 of a set of side ferromagnetic elements 1402 connected by thin cross structure metal connections 1404 for stability. Thin strips of ferromagnetic material 1402 used as cross structures will not interfere with wireless charging. Such a structure 1400 may be used, for example, in place of strips 102, 1102, 1202, 1302, or the like.

Figure 15:
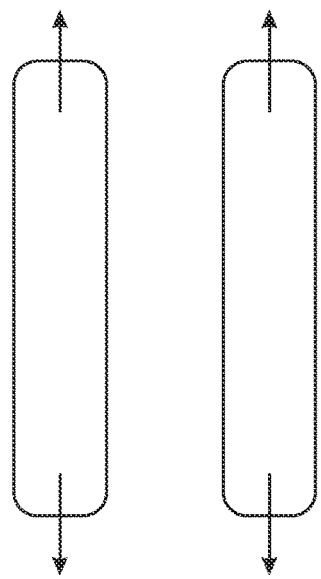
FIG. 15 is a view of ferromagnetic plates of a different length according to an embodiment of the present disclosure.

It should be understood that while ferromagnetic strips such as strips 102, 1102, 1202, 1302, and 1402 have been shown at particular lengths, different lengths of ferromagnetic material may be used depending upon the size and configuration of the mobile device to which the strips are to be attached, or within which the strips are integrated This is shown in FIG. 15.

When wireless charging is used, a user gets the fastest and most effective charging when the charging coil on the charger is perfectly aligned with charging coil on the device. This alignment between charging pad coil and device charging coil creates the most efficient connection and the user benefits with faster charging. Embodiments of the present disclosure provide an application that when loaded on a mobile device, displays a centering solution for proper alignment of the mobile device to a charging coil of a charging pad.

Figure 16:
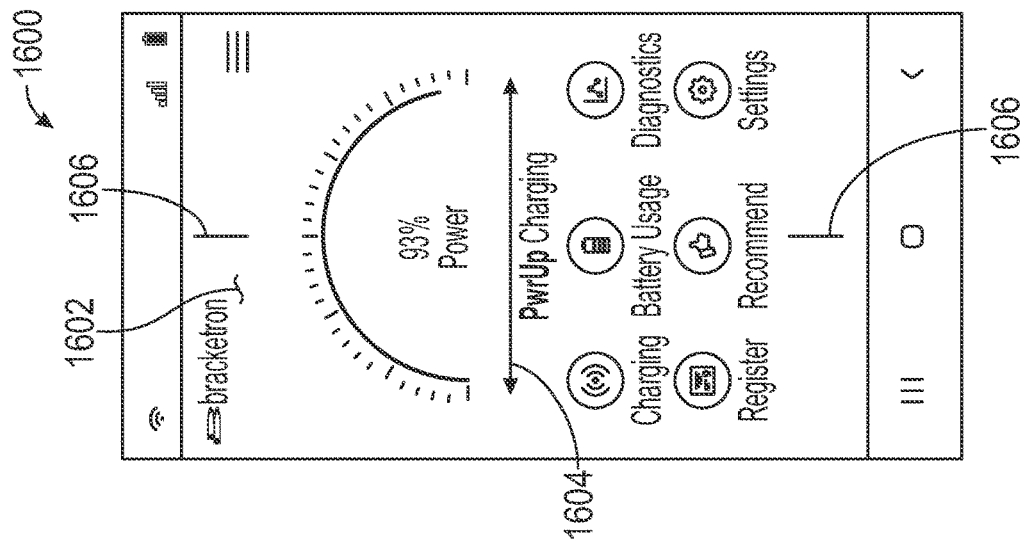
FIG. 16 is a sample screen shot of an application according to an embodiment of the present disclosure.

A screen shot of a mobile device application embodiment 1600 of the present disclosure is shown in FIG. 16. Application alignment screen 1602 in one embodiment displays a substantially horizontal alignment line 1604 at a location top to bottom on the mobile device screen corresponding to a vertical mounting position for a best charge position for the mobile device on a charging pad. Further, in one embodiment, horizontal alignment lines 1606 are displayed on the alignment screen 1602, the horizontal alignment lines 1606 corresponding to a horizontal mounting position for a best charge position for the mobile device on a charging pad. The alignment lines 1602 and/or 1604 show the user where the center of the charging coil for the user's specific device is located.

Application 1600 further provides utilities that, for example, provide detailed power management utilities, including but not limited to information about charging status, battery usage, diagnostics, and the like for a mobile device on which the application 1600 is loaded.

It should therefore be understood that the alignment lines 1604 and 1606 may be positioned differently on the alignment screen 1602 for different mobile devices, such as mobile devices that have a charging coil or the like positioned at a different location than a center of the mobile device. Placing the alignment lines 1604 and/or 1606 on the alignment screen 1602 may therefore be different for different mobile devices, without departing from the scope of the disclosure.

Figure 17B:
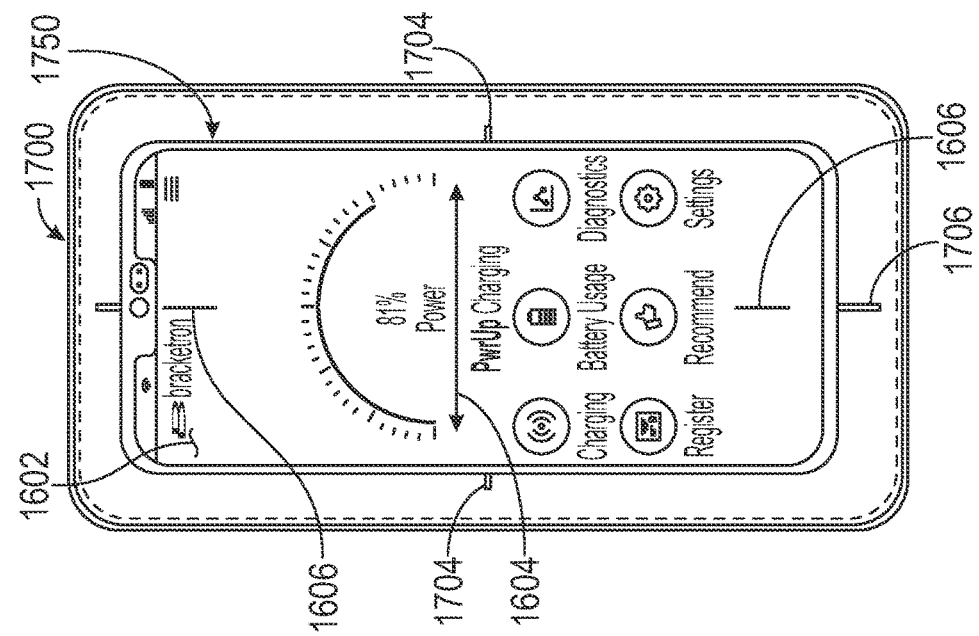
FIG. 17B is a view of a mobile device using the application of FIG. 16 on the charging pad of FIG. 17A.
Figure 17A:
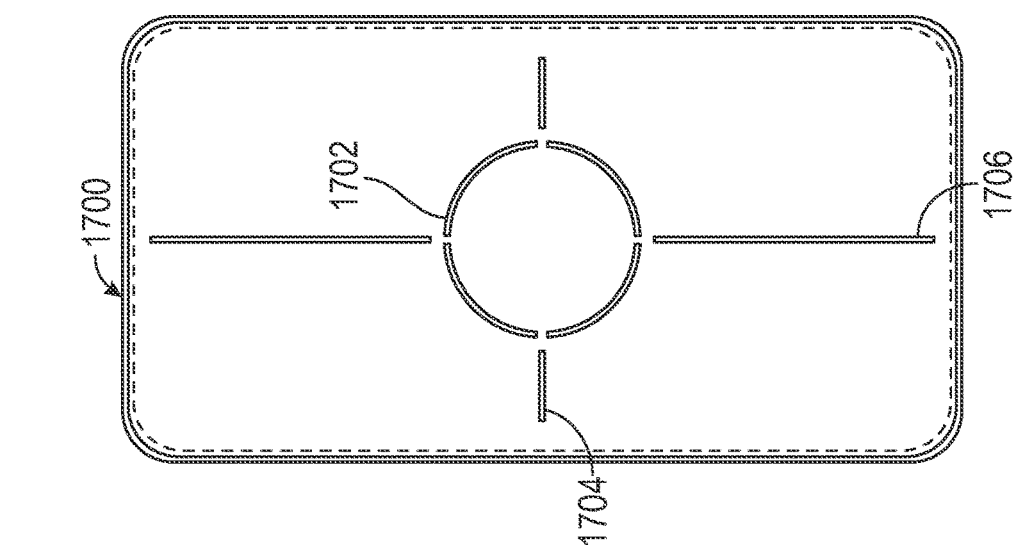
FIG. 17A is a view of a charging pad according to an embodiment of the present disclosure.

FIG. 17A is a top plan view of a charging pad 1700 according to an embodiment of the present disclosure. Charging pad 1700 is designed to function as a charging pad for suitable devices, but also in this embodiment is designed to function in conjunction with a mobile device using the application 1600. Specifically, charging pad 1700 has a charging coil located at the point of intersection 1702 of charging pad alignment lines 1704 and 1706. Charging pad alignment line 1704 corresponds to application alignment line 1604, and charging pad alignment line 1706 corresponds to application alignment line 1606. In one embodiment, the charging pad 1700 has magnets embedded therein, such as those shown above with respect to FIGS. 6, 8, 9A-9B, 10A-10B, for assisting in retention of the mobile device 1750 in a proper charging position on the charging pad 1700.

One function of the application 1600 is to assist a user in placing the user's mobile device perfectly on the charging pad 1700. By integrating alignment markers 1704/1706 into the pad 1700, and using corresponding alignment lines 1604/1606 on the application, the user is able to properly position the device on the charging pad charging coil near perfectly each time. FIG. 17B shows a mobile device 1750 using application 1600 on alignment screen 1602, with the mobile device 1750 positioned on charging pad 1700, using alignment lines 1604 and 1606 of the application screen 1602 aligned with alignment lines 1704 and 1706 respectively of charging pad 1700. It should be understood that some embodiments of the application 1600 may use only one alignment line (e.g., line 1604 on application screen 1602) for alignment, without departing from the scope of the disclosure.

Figure 18A:
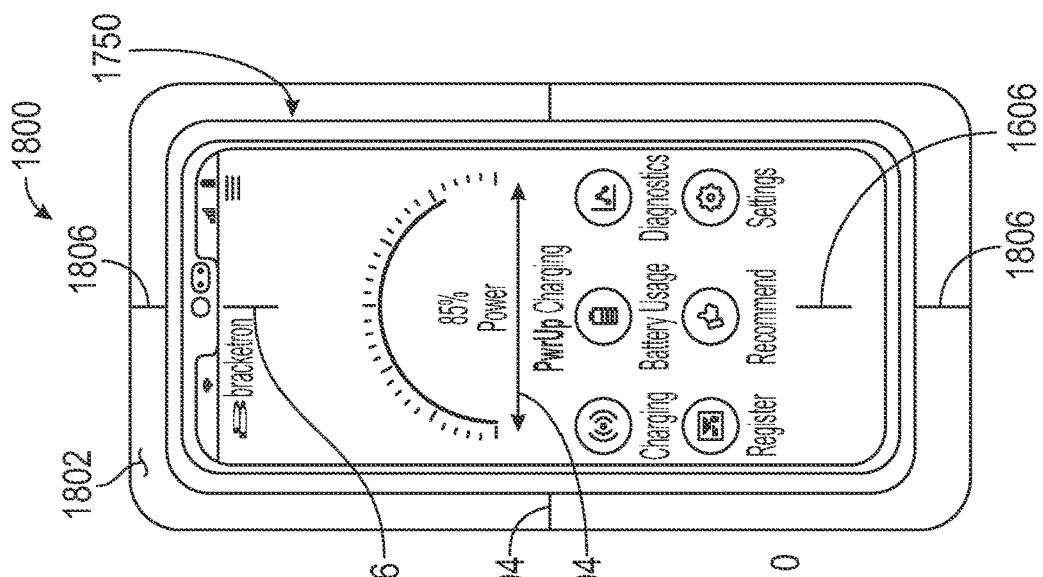
FIG. 18A is a bottom view of a template mount according to an embodiment of the present disclosure.

Application 1600 is also configured to assist in the proper mounting of metal strips such as those described above with respect to FIG. 1. In another embodiment as shown in FIG. 18A, a template 1800 is provided for use with the application 1600 loaded onto a mobile device. Application 1600 provides a method for mounting metal strips to the mobile device in a proper location without measuring. As has been mentioned, application 1600, once loaded on a mobile device, knows or obtains the position of the charging coil of the device, and provides alignment lines 1604 and/or 1606 that are used in one embodiment for proper mounting of metal strips of a template.

Figure 18B:
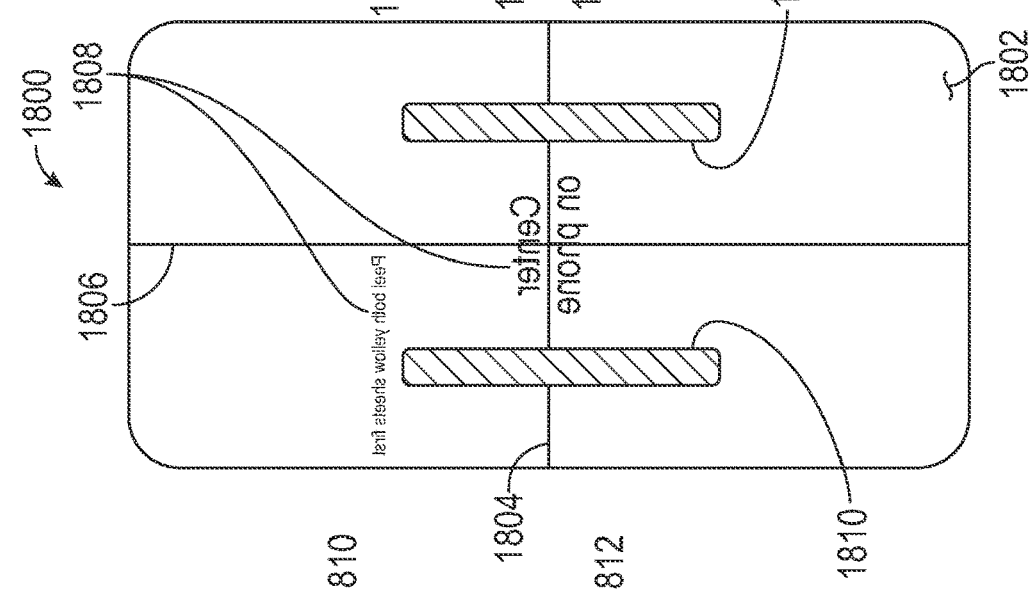
FIG. 18B is a bottom view of the template mount of FIG. 18A prepared for installation to a mobile device.
Figure 18C:
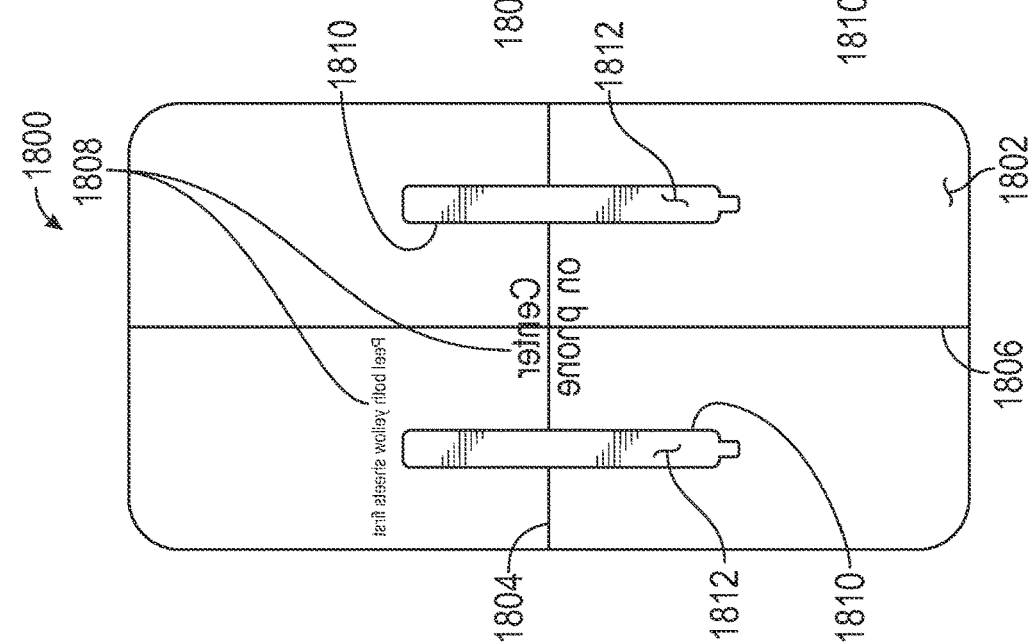
FIG. 18C is a view of a mobile device using the application of FIG. 16 to assist in installing the mount of FIG. 18A.

As shown in FIG. 18A, template 1800 comprises a template base sheet 1802 having alignment lines 1804 and 1806. Alignment line 1804 is in one embodiment substantially horizontal and alignment line 1806 is in one embodiment substantially vertical, with the lines being perpendicular to one another. In one embodiment, instructions 1808 are printed on the base sheet 1802 as well. Metal strips 1810 are releasably mounted to the base sheet 1802. Metal strips have an adhesive side away from the base sheet 1802 which before installation is covered with a release liner 1812. A user places the template on a surface in one embodiment, with the release liner 1812 facing upward. The release liner 1812 is removed to expose the adhesive on strips 1810, as shown in FIG. 18B. The mobile device 1750, with the application 1600 alignment screen 1602 active, is positioned above the template 1800, and alignment lines 1604 (and optionally also 1606) are aligned with lines 1804 and 1806 of template 1800. Once aligned, the mobile device is pressed onto metal strips 1810, adhering the metal strips to the device in their proper position. Once the metal strips 1810 are adhered to the mobile device 1750, the template base sheet 1802 is peeled off, and the metal strips 1810 are attached to the device 1750 in the proper position to be aligned to a charging pad 1700 using the application alignment screen 1602 and the lines 1604/1606 and lines 1704/1706.

It should be understood that embodiments of the template 1800 allow for the effective and proper installation of many different types of metal strips, plate(s) or magnets on the back of a device such as device 1750 with precise and correct alignment to allow for effective, fast, and proper charging of the mobile device 1750.

Embodiments of the application 1600 of the present disclosure may be operable on computer systems, such as systems of mobile devices including but not limited to mobile phones, tablet computers, music players and the like. Although not required, the application can be implemented at least in part, in the general context of computer-executable instructions, such as program modules, being executed by a computer and/or processor such as is present in a mobile device as described above and herein. Generally, applications and/or program modules include routine programs, objects, components, data structures, etc., which perform particular tasks or implement particular abstract data types. Those skilled in the art can implement the description herein as computer-executable instructions storable on a computer readable medium. Moreover, those skilled in the art will appreciate that the invention may be practiced with other computer system configurations, including multi-processor systems, networked personal computers, mini computers, main frame computers, and the like. Aspects of the disclosure may also be practiced in distributed computing environments where tasks are performed by remote processing devices that are linked through a communications network. In a distributed computer environment, program modules may be located in both local and remote memory storage devices.

Advantages of the embodiments of the present disclosure include a magnetic mount/stand that charges a device wirelessly. The designs described herein create a more predictable and simpler initial setup for the user. The designs create a better aesthetic solution for the user, including smaller/sleeker mounts/stands and more attractive metal strips. The designs allow for a nearly universal solution for most devices to eliminate the need to create multiple versions of the product. The designs of the stands/mounts of present disclosure may be integrated into other products such as wall chargers, desk stands and charging pads, without departing from the scope of the disclosure.

Although the present disclosure has been described with reference to preferred embodiments, workers skilled in the art will recognize that changes may be made in form and detail without departing from the spirit and scope of the disclosure.

What is claimed is:

1. A mobile device mounting template, comprising:
at least one ferromagnetic strip; and
a base sheet to which the at least one ferromagnetic strip is releasably affixed, the base sheet comprising a template sheet and a release liner, the template sheet having markings thereon for positioning the device mounting template on an inductively charged mobile device, and the release liner being removably releasable from the template sheet to mount the at least one ferromagnetic strip to a body of the mobile device to allow alignment of the mobile device to an external charger for wireless charging;
wherein the plurality of markings includes a first line extending in a direction from a first side of the base sheet to an opposite second side of the base sheet, the first line indicating an alignment orientation for the at least one ferromagnetic strip.

2. The mobile device mounting template of claim 1, wherein the at least one ferromagnetic strip comprises a pair of ferromagnetic strips extending substantially parallel to one another.

3. The mobile device mounting template of claim 2, wherein the plurality of markings comprises a pair of perpendicular alignment lines, the pair of perpendicular alignment lines positioned to cross at a midpoint between the pair of ferromagnetic strips.

4. The mobile device mounting template of claim 1, wherein the plurality of markings includes instructions for use of the template.

5. The mobile device mounting template of claim 1, wherein the plurality of markings further includes a second line extending in a direction from a third side of the base sheet to an opposite fourth side of the base sheet, the second line indicating a second alignment orientation along the third and fourth sides for the at least one ferromagnetic strip.

6. The mobile device mounting template of claim 1, wherein the at least one ferromagnetic strip has an adhesive thereon for fixing the at least one ferromagnetic strip to the mobile device.

7. A charging system for an inductively charged mobile device, the charging system comprising:
a charging pad having a charging coil in a charging pad body, and a plurality of markings on the charging pad body, the plurality of markings identifying a center of the charging coil; and
a mounting template, comprising:
a pair of ferromagnetic strips; and
a base sheet to which the pair of ferromagnetic strips is releasably affixed, the base sheet comprising a template sheet and a release liner, the template sheet having markings thereon for positioning the device mounting template on the inductively charged mobile device for affixing the pair of ferromagnetic strips to the inductively charged mobile device, and the release liner being removably releasable from the template sheet to mount the pair of ferromagnetic strips to a body of the inductively charged mobile device to allow alignment of the inductively charged mobile device to an external charger for inductive charging.

8. The charging system of claim 7, wherein the pair of ferromagnetic strips have an adhesive thereon for fixing the pair of ferromagnetic strips to the mobile device.

9. The charging system of claim 7, wherein the markings of the mounting template includes instructions for use of the template.

10. The charging system of claim 7, and further comprising a mobile device application configured to be loaded into storage of a mobile device to assist in the affixing of the pair of ferromagnetic strips to the mobile device, the mobile device application comprising a set of non-transitory instructions for causing a processor of the mobile device to perform a method, the method comprising:
displaying on a screen of the mobile device an alignment screen having an alignment line thereon, wherein the alignment line is configured to indicate a position of a charging coil of the mobile device.

11. The charging system of claim 7, and further comprising a mobile device application configured to be loaded into storage of a mobile device to assist in the placement of the mobile device on the charging pad for proper charging position, the mobile device application comprising a set of non-transitory instructions for causing a processor of the mobile device to perform a method, the method comprising:
displaying on a screen of the mobile device an alignment screen having an application alignment line thereon, wherein the application alignment line is configured to indicate a position of a charging coil of the mobile device, wherein when the alignment line is aligned with the corresponding marking on the charging pad, the charging coils of the charging pad and the mobile device are aligned.

12. A method of mounting a ferromagnetic strip to an inductively charged mobile device, comprising:
   positioning a template including a base sheet comprising a template sheet and a release liner, the template sheet having the ferromagnetic strip removably attached thereto so that the ferromagnetic strip is exposed;
   positioning the ferromagnetic strip on the inductively charged mobile device using a template alignment line on the template;
   adhering the ferromagnetic strip to the inductively charged mobile device with an adhesive on the ferromagnetic strip; and
   removing the template.

13. The method of claim 12, wherein positioning the ferromagnetic strip comprises positioning the mobile device so that a back thereof faces the template, wherein the mobile device is positioned to align a charging coil of the mobile device with template alignment line, the template alignment line indicating an alignment position relative to the ferromagnetic strip of the charging coil.

14. The method of claim 12, wherein positioning the ferromagnetic strip on the mobile device comprises using an application loaded into memory of the mobile device, the application comprising a set of non-transitory instructions for causing a processor of the mobile device to perform a method of assisting in alignment of the mobile device with respect to the ferromagnetic strip.

15. The method of claim 14, wherein positioning using the application comprises:
   displaying on a screen of the mobile device an alignment screen having an application alignment line thereon, wherein the application alignment line is configured to indicate a position of a charging coil of the mobile device; and
   aligning the application alignment line template alignment line.

16. The method of claim 15, wherein positioning the ferromagnetic strip further comprises:
   displaying on the alignment screen a second application alignment line perpendicular to the application alignment line, wherein the second application alignment line and the first application alignment line intersect at a center of the charging coil of the mobile device; and
   aligning the second application alignment line with a second template alignment line perpendicular to the template alignment line to align the charging coil of the mobile device with a center of the template.

* * * * *